United States Patent [19]
Eickmann

[11] 3,806,066
[45] Apr. 23, 1974

[54] HYDROSTATIC SYNCHRONIZATION DEVICE FOR COUNTER-REVOLVING AND CO-AXIAL ROTORS

[76] Inventor: Karl Eickmann, 2420 Isshiki, Kayama-machi, Kanagawa, Japan

[22] Filed: Aug. 6, 1971

[21] Appl. No.: 146,560

Related U.S. Application Data

[60] Continuation-in-part of Ser. No. 48,851, June 12, 1970, which is a continuation of Ser. No. 766,742, Oct. 11, 1968, abandoned, which is a division of Ser. No. 552,559, May 24, 1966, Pat. No. 3,405,890.

[52] U.S. Cl. .......................................... 244/17.23
[51] Int. Cl. .......................................... B64c 27/10
[58] Field of Search.......... 244/17.19, 17.23, 17.21, 244/17.11, 7 R, 7 C, 60; 60/421, 424; 91/492, 497

[56] References Cited
UNITED STATES PATENTS

| | | | |
|---|---|---|---|
| 2,454,138 | 11/1948 | Delzer | 244/60 X |
| 2,916,832 | 12/1959 | Hofmann | 244/17.19 X |
| 3,049,321 | 8/1962 | Nichols | 244/17.19 |

FOREIGN PATENTS OR APPLICATIONS

| | | | |
|---|---|---|---|
| 58,961 | 5/1913 | Austria | 244/17.11 |
| 203,876 | 6/1959 | Austria | 244/17.23 |
| 1,148,657 | 12/1957 | France | 244/17.21 |

*Primary Examiner*—George E. A. Halvosa
*Assistant Examiner*—Paul E. Sauberer
*Attorney, Agent, or Firm*—McGlew and Tuttle

[57] ABSTRACT

A fluid borne propeller driven aircraft includes a body, at least two hydraulic motors on the body, each rotating an upwardly extending drive shaft, respectively, each motor urging a shaft which is substantially coaxial, one shaft being tubular and the other shaft extending upwardly through and beyond said tubular shaft. Propellers are mounted for rotation on each shaft above said body. A source of hydraulic fluid under pressure is carried on said body and connected through fluid flow lines source to the motors. Means are provided for driving the propellers in opposite rotational directions including a pump to produce the flow of fluid through each of said motors in two streams constantly proportionate to each other. The pump includes a pump housing and a rotor for fluid handling rotatably mounted in the pump housing. The rotor has first and second separated chambers with respective inlets for connecting the first chamber with the fluid flow lines. They also have outlets for connecting them with the respective fluid flow lines. At least two pistons are slidably mounted in the rotor with one piston slidably positioned so as to move into and out of said first chamber, and at least another piston slidably positioned so as to move into and out of said second chamber. An actuator comprises a member slidably disposed in said pump housing and an eccentrically rotatable member within which the rotor is rotatably mounted and which contacts the pistons as the rotor turns within said pump housing whereby the propellers are driven at constantly proportionate angular velocities to one another.

10 Claims, 5 Drawing Figures

PATENTED APR 23 1974  3,806,066

HYDROSTATIC SYNCHRONIZATION DEVICE FOR COUNTER-REVOLVING AND CO-AXIAL ROTORS

CROSS-REFERENCE TO PRIOR APPLICATIONS

This application is a continuation in part of copending Pat. application Ser. No. 48,851 of June 12, 1970, which is a streamlined continuation application of Pat. application Ser. No. 766,742 of Oct. 11, 1968, now abandoned. Said Pat. application Ser. No. 766,742 of Oct. 11, 1968 was a divisional application of Pat. application Ser. No. 552,559 filed on May 24, 1966 under title: "CONTROL MEANS IN FLUID POWER-DRIVEN, FLUID-BORNE VEHICLES" which is now issued U.S. Letters Pat. No. 3,405,890 of Oct. 15, 1968.

BACKGROUND OF THE INVENTION AND PRIOR ART

In the past, counter revolving rotors or propellers were driven by mechanical gear means. Also in the past, counter rotating rotors were arranged on shafts, where one shaft extended through another shaft which was hollow. However, these mechanically geared or driven counter revolving rotors were either capable only of little torque, or required too voluminous driving or gear means which were necessary for driving said rotors.

Actually, counter rotating rotors are needed to drive boring, grinding, cutting or polishing means, especially in or for making bores. The driving means, however, become larger in diameter than the working members of the devices, so that the devices could not be extended or moved into the holes or bores to be made. It is, therefore, the object of the present invention to provide a driving means for driving counter revolving rotors with a drive means which is smaller in diameter than the diameter of the largest working member of the driving means.

Also in the past, counter rotating propellers of aircraft or helicopters were driven by mechanical gear means. However, these gear means were heavy and took away a lot of traction capability of the propellers by their weight. These mechanically geared drives for counter rotating propellers of fluid borne crafts were also too large in diameter, so that their volume occupying the fluid streams through the propellers gave great resistance to the fluid streams created by the propellers. As a result, the voluminousness of the driving means reduced the efficiency of the driving or bearing fluid streams which were created or actuated by the propellers.

SUMMARY OF THE INVENTION

This invention relates to a driving means for driving counter revolving rotors and, more particularly, to a hydrostatic driving means of little weight, little size, high torque and high efficiency and power for driving counter rotating rotors with definite proportionate torque and rotary angular velocity at all times.

The invention further relates to driving means which may be utilized in propeller driven or supported fluid borne craft, and more particularly, to a new and improved fluid borne craft having a pair of coaxial propellers rotated respectively in opposite angular directions to control the support or movement of the craft. In such a craft, a third propeller may be mounted laterally of the craft to control the attitude thereof.

The driving means of the invention may further be utilized in boring devices, cutting devices, grinding devices, polishing devices or other working means which utilize counter rotating working members to achieve the desired working effect.

The drive means of this invention consist of a multi-flow fluid flow producing means having a plurality of working chamber groups arranged in the fluid flow actuation means of the fluid flow producing means. Said plurality of working chamber groups of the fluid flow producing means each have one working chamber group having a separated fluid flow outlet, which does not communicate with the outlet of another working chamber group and which does not communicate with the other working chamber group. All working chamber groups of the fluid flow producing means have a common displacement actuator means for assuring, that the rate of flow of fluid out of each output of the fluid flow producing means is at all times definitely proportionate or equal to the rate of flow of fluid out of the other output or outputs of the fluid flow producing means. One output of the fluid flow producing means is connected by a fluid line to the entrance port of one hydraulic motor, while the exit port of this hydraulic motor is connected respectively by another fluid line to an entrance port of the fluid flow producing means. Another output of the fluid flow producing means is connected by a fluid line to the entrance port of another hydraulic motor, while the exit port of this other hydraulic motor is connected by another fluid line to an entrance port of the fluid flow producing means. The said fluid lines are separated from each other and do not communicate with each other. Thereby, it is assured that the fluid column between the respective working chamber group of the fluid flow producing means and the respective associated hydraulic motor remains uninterrupted during operation and that no fluid can escape from one fluid into another fluid flow. The described separated and uninterrupted condition of the respective fluid columns between the respective working chamber group of the fluid flow producing device and the respective connected hydraulic motor is a definite necessity in order to achieve at all times a proportionate condition of torque and rotary angular velocity of the rotors of the hydraulic motors. One of the hydraulic motors has a hollow shaft through which the shaft of the other hydraulic motor is extended. One of the hydraulic motors has a displacement actuator located in opposition for revolving in a direction contrary to the rotary direction of the other hydraulic motor. Alternatively, the delivery fluid line to one of the hydraulic motors is connected to the exit port of said motor in order that the said hydraulic motor revolves in the opposite direction to the other hydraulic motor. The return fluid line of said motor would then otherwise be set between the entrance port of said motor and the entrance port of the fluid flow producing means.

Thus, the rotary angular velocity of the hydraulic motors is actuated and kept by the common actuator means in the fluid flow producing means to be at all times of proportionate or equal rotary angular velocity in the counter direction. The shafts of the hydraulic motors bear the desired working members, such as cutters, grinders, polishers, propellers or the like, so as to be driven and maintained by said shafts of said hydraulic motors.

Another embodiment of the drive means of this invention is characterized in that a common fluid flow producing means, such as, for example, a single flow outlet pump, is connected to a fluid line, which extends and connects to the entrance port of one hydraulic motor. The exit port of said hydraulic motor is connected by a communication means to the inlet port of another hydraulic motor so that both motors are connected in a fluid flow series. The exit port of the last mentioned hydraulic motor is connected by a fluid line to the entrance port of the fluid flow producing means. One of the said hydraulic motors has a hollow shaft through which the shaft of the other motor extends.

Each of the hydraulic motors is located axially behind the other on substantially coaxial position. Only in a few special cases may an eccentric position of one of the motors be provided relatively to another. In such cases, the hub of the one motor must be of a large diameter with respect to the other. In case of more than two hydraulic motors arranged for driving more than two revolving working members, it is suitable to make more than one motor hollow and extend one hollow shaft of one motor through the hollow shaft of another motor.

It is known to cut bores or holes into material or mountains by single revolving working members, such as cutters or the like. However, large machines were used for this purpose, where the body of the machine provided the resistance against the reaction torque of the working member. The bodies of the machines were larger than the diameters of the holes made by the working members. Consequently, the driving machines could not enter into the holes which the working members made.

In order to makes holes without reaction torque resisting large machine bodies, it is necessary to use counter revolving working members of about equal or proportionate torque. Then, the reaction torques equalize each other. The materials into which holes are to be made are not uniform at all times. They may have different resistance to working holes into them at different locations. For example, in one place, mountains may have particularly hard rocks, and at other places, soft sand. Consequently, one of the working members may enter soft material while another working member may enter harder material. If there would be interconnection between the drives of hydraulic motors for driving working members in such said different materials, then one of the working members might come to a standstill, while another motor would drive the respective other working member with increased rotary velocity compared to the first working member. Under the bigger resistance of one of the working members, the fluid to said heavier loaded motor would escape from the respective fluid line and enter into the other fluid line to the less loaded hydraulic motor. To avoid such a condition, which would render the driving means useless, the separated and uninterrupted communication means of the invention are applied. In this way, such stalling of one of the driving motors and such faster rotating of the other motors is prevented. Such prevention can also be achieved by mechanical drive means, but they are too heavy and too voluminous so that they cannot easily be built of such small diameter, as to enter the hole which the working members make.

In addition, those mechanical drives need a large number of reduction gearing means which make the drive rather heavy and expensive.

In most cases of the application of the device of the invention, the working members revolve with equal torque and equal but counter directed rotary angular velocity. For example, fluid borne craft can be driven by counter revolving propellers which are driven by means of the invention with equal torque and equal but counter directed rotary angular velocity. In other cases, however, different, but proportionate rotary velocities and torques, may be needed for such applications. In addition, equal torques, but different rotary angular velocities may be needed. For example, for cutting a hole through material, e.g., the earth or a mountain, the outer working member may need to revolve slower than the inner working member. For the case of such applications, either the working volumes of the hydraulic motors may be different in the device of the invention, or the working chamber groups of the fluid flow producing means of the invention may be of different volumes.

In order to equalize the torque for attaining equal torque reaction forces, the respective working members driven by the hydraulic motors may be of different radial extension. By this means, the smaller speed of the outer working members may still have the same torque as the faster revolving inner working member. In all cases, however, the methods of connection according to the invention, and of the sizes of the working chambers of the hydraulic motors and the fluid flow producing means or the said means in addition to the common actuator means of the multiflow fluid flow producing means assure, at all times, proportionate rotary angular velocities of the hydraulic motors and of the working members which are driven thereby.

For making holes in steel, wood and other materials, e.g., earth of mountains, the working members may be cutters or grinders. For polishing, they may be polishing means and for bearing or driving fluid borne craft, they are rotors or propellers.

In the application of the synchronization device of the invention to a fluid borne craft, the two coaxial propellers are driven by hydraulic motors which are supplied with equal or constantly proportionate flows of fluid from a source of hydraulic fluid under pressure. The hydraulic motors are driven in opposite angular directions, respectively, the one motor driving a tubular shaft and the other motor driving a shaft extending coaxially through and beyond the tubular shaft, and each shaft has a propeller affixed thereto. In this application, a third propeller may be mounted laterally of the craft and may be adjustable as to the angle of its axis of rotation relative to the combined axis of the first two propellers. By this means, the third propeller can be used to control the attitude of the craft when the latter is fluid borne, such as on water or in the air.

The hydraulic source of fluid under pressure may have a single output supplying fluid under pressure of the first two motors in series, and the fluid under pressure may also flow in series through the third motor of the craft for driving the third propeller. Alternatively, the source of fluid under pressure may have two or more outputs with the fluid flow from all of the outputs being constantly equal or proportionate at all times. With the arrangement, the two motors driving the coaxial propellers are connected in parallel to the source of fluid under pressure, one to each output thereof. The third motor may be connected to another output with the interposition of suitable flow control means or the third motor may receive fluid discharged from either one or both of the two motors driving the coaxial propellers.

An object of the invention is to provide a hydrostatic synchronization means for counter revolving rotors wherein the rotors revolve at all times continuously with proportionate rotary angular velocity.

Another object of the invention is to prevent slip between the rotary velocities of a plurality of coaxial counter revolving rotors.

Another object of the invention is to assure that the rotary velocity of a plurality of counter rotating rotors or propellers is proportionate by connecting the rotor driving hydraulic motors in series to a source of hydraulic fluid under pressure.

Still another object of the invention is to assure that the angular rotary velocity of counter rotating rotors is proportionate by connecting each motor in parallel to a multi-flow fluid power source wherein the proportionate rate of flow of fluid out of the outputs of the source is assured by proportionate displacement volumes of different working chamber groups in the fluid flow supply source.

A further object of the invention is to provide a boring, cutting, polishing, grinding, or working device, with at least two counter rotating working members of continuously proportionate rotary angular velocity having coaxially arranged working members.

A still further object of the invention is to provide a working device with at least two coaxially arranged working and counter rotating working members associated with a driving and synchronization means having hydrostatic operation and having a diameter smaller than the diameter of the working, counter revolving working members.

Another object of the invention is to provide an improved fluid borne, propeller driven craft wherein the tendency to tilt and crash is avoided as in laterally mounted hydraulically driven propeller craft.

Still another object of the invention is to provide such a craft having a pair of coaxial propellers rotated in opposite angular directions, respectively, whereby complicated gearing means on top of the craft are avoided.

A further object of the invention is to provide such a craft including a third propeller, mounted somewhat laterally of the two main propellers, and serving to control the attitude of the craft.

Yet another object of the invention is to provide such a craft in which the coaxial propellers are driven by hydraulic motors respectively supplied with hydraulic fluid under pressure at equal or constantly proportionate rates of fluid whereby gear means and control means on top of the craft are avoided because the synchronization of the two counter rotating rotary angular velocity of the propellers is actuated and maintained by the hydraulic fluid circuits.

A further object of the invention is to provide aircraft in which one hydraulic motor drives or contains a tubular shat to which one propeller is secured and the other hydraulic motor drives or contains a shaft extending coaxially through the tubular shaft and beyond it, having the other propeller affixed thereto.

For an understanding of the principles of the invention, reference is made to the following description of typical embodiments thereof as illustrated in the accompanying drawings.

BRIEF DESCRIPTION OF THE DRAWINGS

In the Drawings:

FIG. 3A demonstrates the serial connection of the hydraulic motors of the craft of FIG. 3 as herein described; and FIG. 3B demonstrates a serial connection of the motors of the craft of FIG. 3.

DESCRIPTION OF THE PREFERRED EMBODIMENTS

Figure 1:
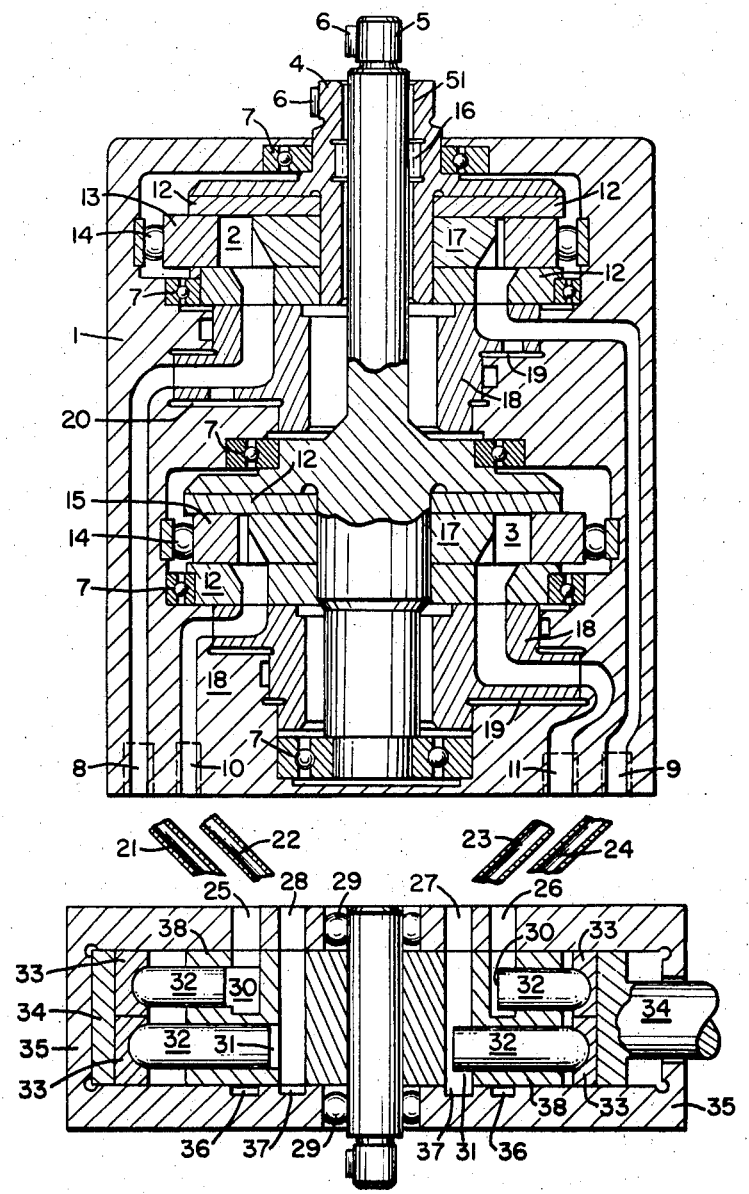
FIG. 1 is a longitudinal sectional view through one embodiment of the synchronization means of the invention.

In the embodiment of a hydrostatic synchronization device, according to the invention as shown in FIG. 1, the pump housing 35 houses the double fluid flow producing means which consists of the fluid handling body 38 which contains the plurality of working chambers 30, 31 which are arranged in groups of the plurality of fluid handling working chambers 30 and 31. The said fluid handling working chambers are separated from each other and they do not communicate with each other. This is a necessity, because if they were to communicate with each other, the synchronizing fluid columns would not be maintained separate, resulting in slip between the driven rotor members as soon as one of them is adapted to a higher torque than the other. The fluid handling body 38 which forms the said fluid handling working chambers 30 and 31 may be a rotor rotatably borne in the bearings 29 in housing 38. At least one displacement member, for example a piston 32, is associated with each one of the working chambers in order to increase and decrease the volume of the fluid handling working chambers 30 or 31, respectively, so that the same fluid is taken in or expelled under pressure. The displacement members 32 or pistons may be provided with guide means, for example piston shoes 33, and the displacement members 32 are actuated for their fluid displacing movement by the common actuator means 34. The said actuator means 34 may be movable in order to actuate and supply a variable displacement volume of the fluid handling working chambers to the same.

Each group of working chambers is associated and communicates with a separated inlet 25 or 28 and to a separated outlet 27 or 26, respectively. In FIG. 1 of the drawing, the working chamber 30 communicates with ports 25 and 26, while the other fluid handling working chamber 31 is associated and communicates with the ports 27 and 28. Each of said ports forms either an inlet or an outlet of the fluid handling device. Thus, the fluid handling device in pump housing 35 had two inlets and two outlets and said outlets supply two separated flows of fluid under pressure which is at all times and continuously of proportionate rate of flow, regardless of the pressure in said flows. This proportionate rate of flow out of fluid from the ports 25 and 28, or 27 and 26 must be proportionate in rate of flow of fluid relative to each other: this is so because both working chambers 31 and 30 are separated from each other, have separated inlets and outlets, and are actuated by an actuator means for actuating the displacement members 32 with definite proportionate displacement stroke.

Fluid lines 21, 22, 23 and 24, shown partially drawn in Figure, are connected to the ports 25 to 28 of the double flow or multiflow hydraulic power supply source contained in housing 35.

In housing 1, two hydrostatic motors are arranged coaxially and behind each other. One of said motors has the fluid handling working chambers 2 and the other has the fluid handling working chambers 3. The actuator means or reaction member 13 defines the volumes of the working chambers 2 of the one of said motors, while the actuator means or reaction member 15 defines the volumes of the working chambers 3 of the other of the hydraulic motors. Each working chamber group in each motor has in the known way a plurality of working chambers which increase and decrease their volume during a rotation and, as is also known, the supply of fluid under pressure into the increasing volumes of the respective working chambers 2 or 3 causes the respective oil motor or hydraulic motor to revolve. The supplied fluid pressure and fluid flow which is supplied to each of the respective motors provides the torque and rotary velocity to the said motors.

Thus far, the said two hydraulic motors work as known from the prior art of hydraulic motors. The working chambers of the hydraulic motors may be cylinders with pistons moving therein or any other kind of known hydraulic motor working chambers. In the illustration shown in FIG. 1, the hydraulic motors have fluid handling working chambers between vanes arranged in slots in rotors 17 and 18 and the end wall means 12 thereof, while the working chambers are closed in radial direction by the housing rings 13 or 15, respectively, which rings revolve on bearings 14.

Housing rings 13 and 15 and bearings 14 thereof, are arranged eccentrically with respect to the axis of rotors 17 and 18 of the two oil motors or hydraulic motors in housing 1. The distance of the eccentric axis of rings 13 and 15 from the center axis of rotors 17 and 18 defines the working volumes of working chambers 2 and 3 in the hydraulic motors. The location of the entrance and exit ports for transfer of fluid into and out of the fluid handling working chambers 2 and 3 of hydraulic motors in housing 1, and the direction of eccentricity to the one or the other side of the respective hydraulic motor defines the direction of rotation of the said hydraulic motor. The working chambers 2 of the upper hydraulic motor communicate with ports 8 and 9 and by this means, one port acts as inlet port and the other acts as outlet port for the fluid which flows through the working chambers 2 of this hydraulic motor.

The working chambers 3 of the lower located hydraulic motor communicate to ports 10 and 11 and by this means, one port acts as inlet port, and the other acts as outlet port for the fluid which flows through the fluid handling working chambers of the respective hydraulic motor.

The revolving members of the rotor and associated members are rotatably borne on bearings 7. On one axial end of each rotor of each of the hydraulic motors, respectively, fluid containing thrust chambers 19 and 20 are formed, in which the fluid flow control body or rotor 18 of each of the motors respectively is located and pressed against the end face of each of the rotors respectively of the respective hydraulic motor for sealing with its stationary control face along said end face of said rotor member 12. The respective control body or rotor 18 may have an eccentric shoulder in a respective eccentric fluid pressure containing thrust chamber in order to assure that the control body is evenly forced against the rotary control face of the respective rotor member 12 of the respective hydraulic motor. The fluid pressure containing thrust chambers 19 and 20 and the control or rotor bodies 18 located therein are shown turned 90° in the drawings, because otherwise, the fluid lines therethrough would not be visible. Either the fluid handling thrust chambers 19 and 20 and the control bodies 18 or rotor located therein or the bearings 14 for housing rings 13 and 15 are positioned eccentrically in the opposite direction in order to assure that one of the rotors 17 or 18 of the two hydraulic motors revolves in the opposite direction relative to the other of said rotors of said hydraulic motors. Respective balancing recesses, not numbered, may be added to the control bodies or rotor 18 in order to prevent their tilt. According to the invention, the rotors and their associated fluid flow control means are so arranged that the rotor 17 of the upper hydraulic motor, together with its rotor members 12, has a hollow shaft 4 through which the center bore or rotor hub 51 extends. On the end of said hollow shaft 4 of the upper motor with working chambers 2, there are fastening means 6 provided for fastening or affixing a respective working rotor or propeller thereto.

Further in accordance with the invention, the lower motor having the working chambers 3, has rotor members 18 and 12 with a shaft 5 which is coaxial with the hollow shaft 4 of the upper motor and extends therethrough and beyond the same. The end of shaft 5 is also provided with fastening means 6A for affixing a rotor or propeller thereto. A clearance is provided between the inner diameter of the hollow shaft 4 and the outer diameter of the shaft 5, so that the shaft 5 can revolve with a different rotary direction from the hollow shaft 4. Bearing 16 is preferably set between shafts 5 and 4 at the upper end of them or close to the upper end of them in order to get a strong bearing capability of shafts 4 and 5 for bearing and revolving the rotors or propellers which can be affixed safely and stably thereto at definitely the same axis.

The stability of the counter revolving of the motors 2 and 3 in housing 1 is assured by the provision of the described members of the respective motors, their actuator or reaction ring means and their control bodies or rotors 18 and by the provision of said members in the common housing 1 which may consist of several housing members in order to be able to mount the rotor members and control bodies thereinto.

Further in accordance with this invention, in order to assure the definite proportionate rates of flow and thereby of the angular rotary velocity of the rotary shafts 4 and 5 of of the hydraulic motors of housing 1, the following specified communication must be provided by fluid lines to the respective fluid handling device, fluid flow supply source, for example, as in housing 35:

One of the outputs of fluid flow supply source or pump 35 is communicated by one of fluid lines 21 to 24 to the inlet port of one of the motors in housing 1 and the other output of fluid flow supply source 35 is connected by another of the fluid lines 21 to 24 to the inlet port of the other hydraulic motor of housing 1. The exit port of one of the motors in housing 1 may communicate to one of fluid lines 21 to 24 to an entrance port of the fluid flow supply source in housing 35 and the exit port of the other motor in housing may be connected to the other entrance port of the supply source in housing 35 by another of the fluid lines 21 to 24, for example:

Port 25 may be connected by fluid line 21 to port 8;

Port 28 may be connected by fluid line 22 to port 10;

Port 27 may be connected by fluidline 23 to port 11; and

Port 24 may be connected by fluidline 24 to port 9. The fluid lines 21 to 24 may, depending on the situation, be made of rigid or flexible structure.

In another embodiment of the invention, the hydraulic motors in housing 1 may be connected in series. In such a case, a usual power plant may operate a suitable fluid flow supply source which in this case can also be a single flow pump. One fluid line would then extend from the respective fluid flow supply source to the entrance port of one of the motors in housing 1, for example, to port 8. The exit port of the said motor in housing 1, for example exit port 9, is then connected by a suitable communication means, like a channel, a bore, or a fluid line to the entrance port for example to entrance port 10 of the other hydraulic motor in housing 1. The exit port of said motor, for example exit port 11, is thereafter connected by a respective fluid line to the entrance port of the fluid flow supply source.

Thus, the fluid stream flows through both of the hydraulic motors in housing 1, revolving both rotors and their shafts 4 and 5 thereby. The contrary rotation is again defined by the respective port connection or eccentricity of rings 13, 15 or control bodies or rotors 18. The eccentric shoulders on the respective control bodies or rotors 18 in the respective eccentric fluid pressure thrust chambers 19, 20, 78 is necessary in order that at the serial connection of the two hydraulic motors, the back flow of the first or upstream motor does not lift the control body or rotor 18 away from the respective control face on rotor member 18. The motors must be fully maneuverable both ways in order to assure the suitable work in serial connection of an upstream motor and a downstream motor. This is assured by the location and configuration of the fluid pressure thrust chambers 19, 20, 78 and the control bodies or rotors 18 therein.

Figure 2:
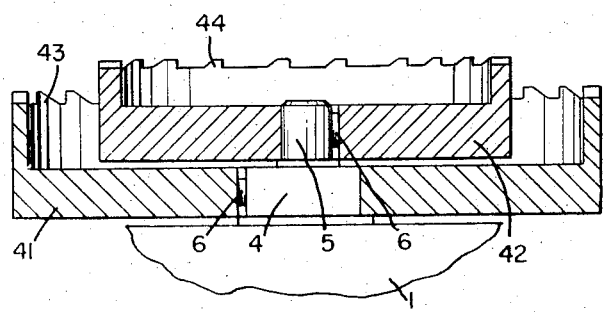
FIG. 2 shows a pair of working members affixed to the synchronization device of the invention, wherein only a portion of the device of FIG. 1 is shown.

FIG. 2 illustrates how the working members 41 and 42 with working means, such as for example cutters 43 and 44, are affixed to the shafts 4 and 5 of motors in housing 1. Shafts 4 and 5 revolve in opposite directions and the working members or working rotors also work in an opposite rotary direction. The working rotors 41, 42 may be grinders, cutters, polishers, propellers or the like.

In FIG. 2, the cutters 43 and 44 are shown as working in opposite rotary directions. Since at work of the working rotors 42, 41 different resistance may appear at the inner and outer working rotor, the radial extension of the working members or working means 43 and 44 may be suitably different in order to equalize the torque of them, so that the torque reaction forces of both rotors sum up to about zero. The rotary angular velocity and torque of the counter revolving rotors 41 and 42 must then be defined accordingly, and so must the pressure in the respective fluid streams which drive the hydraulic motors in housing 1. Consequently, the displacement volumes of the supply source in housing 35 and of the hydraulic motors in housing 1 accordingly must be measured and be continuously proportionate to each other at all times. The proportionate condition of the rotary velocities of the working rotors 41 and 42 is assured by the fluid line communications of the invention to the set displacement means in the fluid flow supply source and the hydraulic motors as explained in the invention.

Figure 3:
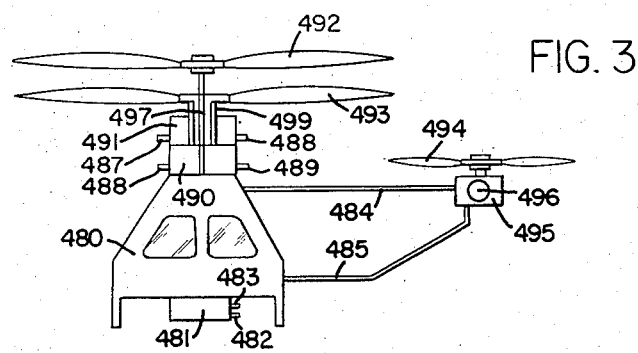
FIGS. 3, 3A and 3B are elevational views, partly in section and partly schematic, illustrating fluid borne, propeller driven crafts embodying the invention.

In FIG. 3, counter rotating propellers are fixed to shafts 4 and 5 of the device of the invention, in order to drive or bear a fluid borne vehicle. The synchronization means of the invention is especially suitable to drive such counter revolving propellers of fluid borne craft, because for the safety of the craft, the exact proportionate rotary angular velocity of the rotating propellers is a necessity. Further, the device of the invention is especially suitable for driving propellers of fluid borne craft, because the device is small in diameter and of little weight, so that it does not take away too much efficiency or bearing capability of the propellers.

A fluid borne propeller driven craft embodying the invention comprises, a body or fuselage, generally indicated at 480, and carrying a source 481 of hydraulic fluid under pressure. Source 481 is carried at a low point on body or fuselage 480, and this may be in the form of a pump of any suitable type driven by an engine. Fluid flow source or fluid flow producing means 481 is provided with fluid inlets and outlets 482 and 483, either of which may be an inlet and the other an outlet, in accordance with the desired connections.

Body 480 is propelled or supported by a pair of propellers 492 and 493 which are rotated respectively in opposite angular directions. Preferably, propellers 492 and 493 are provided above the body 480. Each propeller is secured to the upper end of a respective drive shaft 499 for propeller 493, and 498 for propeller 492. It will be noted that shaft 499 is tubular, having a longitudinally extending tubular bore 497 therethrough, and the shaft 498 extends coaxially through the bore 497 of shaft 499, and projects upwardly above the upper end of shaft 499.

Each shaft 498 and 499 is driven by a respective hydraulic motor 490 and 491, the motor 491 being mounted above and coaxially with the motor 490 in the preferred arrangement. In this embodiment of the invention, motor 491 is provided with a hollow rotor, having an extension which forms a hollow shaft 499. The shaft 498 of motor 491 extends through the rotor and shaft 499 of motor 491 and may be guided therein. Motor 490 has connection means or passage means 486 and 489 extending therefrom, and motor 491 has connection means or passage means 487 and 488 extending therefrom.

Motors 490 and 491 are arranged to rotate the respective propellers 492 and 493 in opposite angular directions, so that a counter rotating duel propeller arrangement is provided. The motors 490 and 491 may be connected either in series or in parallel relation with respect to the fluid flows therethrough. Thus, and through connections which have not been illustrated in FIG. 3, but which will be readily apparent, fluid flow produced in source 481 may be discharged through passage or connection means 482 into passage or connection means 486, for driving motor 490 to rotate its propeller 492 and the fluid flow may exit from motor 490 through passage means 488, and then enter hydraulic motor 491 through passage means 488, with the fluid flow returning the motor 491 through passage or connection means 487 to passage or connection means 483 of pump or fluid flow producing means 481. Thus, the motors 490 and 491 are connected in series with each other for flow of motive fluid or hydraulic fluid therethrough, but the fluid enters and leaves the two motors in such directions that the motors drive the propellers in opposite angular directions. The fluid being returned to source 481, or the fluid flowing in series between the two motors, may pass through suitable cooler or tank means if desired. Alternatively, the fluid flow can be reversed so that passage means 483 becomes the fluid flow output passage and passing means 482 comprises the fluid flow return passage.

Figure 3A:
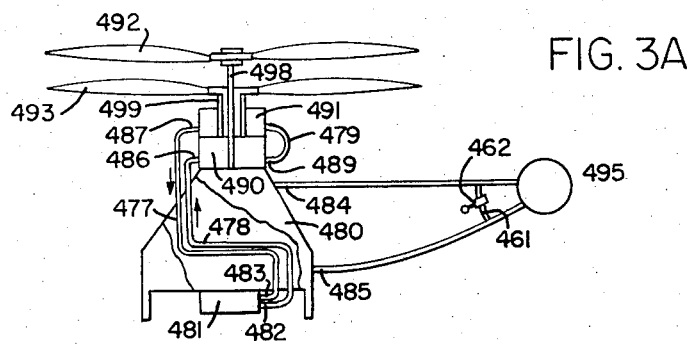
Figure 3B:
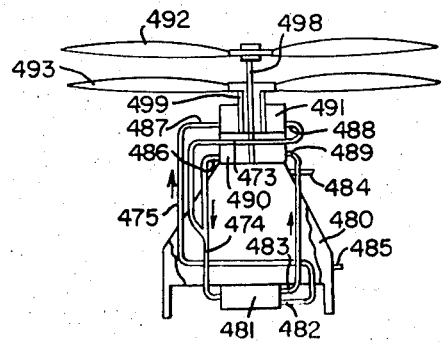

For a better understanding of the embodiment of the invention shown in FIG. 3, reference is made to FIGS. 3A and 3B. In the serial connection shown in FIG. 3A, fluid flows from fluid flow producing means exit port 482 through fluid line 478 into entrance port 486 of motor 490 and through motor 490 for revolving the same. The fluid flow leaves motor 490 through exit port 489 and then flows through the medial fluid line 479 into fluid port 488 of motor 491. The hydraulic pressure fluid then flows through motor 491 for revolving the same in a direction counter revolving to motors 490. The exit fluid leaves motor 491 through exit port 487 and flows back through fluid line 477 into the entrance port 482 of the fluid pressure source 481. The direction of flow of fluid might also be reversed if so desired.

If fluid flow producing means 481 is a two flow fluid flow producing means, producing two flows of equal rate or volume, or constantly proportionate rate or volume, then passage means 482 and 483 may both be constituted delivery lines, as seen in FIG. 3. In this case, passage means 482 supplies fluid under pressure into passage means 486 for driving motor 490 with the fluid flow through motor 490 being returned either directly or through suitable cooling means to fluid flow producing means 481, the fluid leaving motor 490 through passage means 489. The second flow of fluid is delivered from passage means 483 of fluid flow producing means 481 and enters hydraulic motor 491 through passage means 488 to drive shaft 499 and its connected propeller 493. The return fluid flow leaving hydraulic motor 491 flows through passage means 487 for direct or indirect return to fluid flow producing means 481. With this arrangement, counter rotation of the two propellers 492 and 493 with equal or substantially proportionate angular velocity is definitely attained.

This parallel connection of the hydraulic motors to a double flow fluid power supply source is demonstrated in FIG. 3B in greater detail.

One flow of pressure fluid flows from source 481 through port 482 and through fluid line 475 and port 487 into and through motor 491 for revolving the same in one direction. The other flow of fluid flows under pressure with proportionate rate of flow relatively to the mentioned one flow from source 481 through port 483 and fluid line 476 and port 489 into and through motor 490 for revolving the same in the other direction. The return flows may leave motors 490 and 491 through exit ports 486 and 488 through fluid lines 473 and 474 and returning the fluid through port 482 into the fluid pressure source 481. The direction of flow might be reversed if so desired, or in case of necessity.

The vehicle or craft, according to the invention, may be provided with an additional hydraulic motor 495 whose axis may be angularly adjustable about a suitable bearing means 496. Motor 495 has an output shaft to which there is connected a third propeller 494. Hydraulic motor 495 may be driven by motor fluid which flows to or from motor 495 through the passage or conduit means 484 and 485 depending upon the desired direction of rotation of propeller 494. The angular velocity of motor 495 and of propeller 494 can be controlled by suitable control means such as, for example, a controllable bypass 461 with orifice 462 interconnecting the lines 484 and 485. By varying the orientation of the shaft of propeller 494, as well as by varying the speed of rotation of the propeller 494, the attitude of the craft can be readily controlled and stabilized.

While previous mechanical synchronization means have failed to provide reliable devices of small size and little weight so that they disturbed the air flow through propellers or prevented entrance of the deive into bores, the present invention provides a reliable, stepless variable and definitely speed proportionate synchronization device of small size, little weight, height, power and efficiency, so that its application capability multiplies relatively to the devices of the former art.

While specific embodiments of the invention have been shown and described in detail to illustrate the application of the principles of the invention, it will be understood that the invention may be embodied otherwise without departing from such principles.

What is claimed is:

1. In a fluid borne propeller driven aircraft having a body, a first and second substantially vertical coaxial drive shaft arranged one within the other in said body, at least two hydraulic motors on said body each rotating a respective upwardly extending drive shaft, a propeller on each shaft above said body, a source of hydraulic fluid under pressure carried on said body, fluid flow lines for connecting said source of fluid to said motors and directing fluid under pressure through said motors, the improvement comprising: pump means for driving said shafts in respective opposite directions to rotate said propellers in opposite directions and to produce a flow of fluid through each of said motors in two streams substantially constantly proportionate to each other, said means including a pump housing, a rotor for fluid handling rotatably mounted in said pump housing having a first chamber and a second chamber separated from said first chamber, first inlet means for connecting said first chamber with said fluid flow lines, second inlet means for connecting said second chamber with said fluid flow lines, first outlet means for connecting said first chamber with said fluid flow lines, second outlet means for connecting said second chamber with said fluid flow lines, at least two pistons slidably mounted in said rotor, at least one first piston slidably positioned so as to move into and out of said first chamber, and at least one second piston slidably positioned so as to move into and out of said second chamber, an eccentric actuator sleeve rotatable in said pump housing within which said rotor is rotatably mounted engaged with said pistons as said rotor turns within said pump housing whereby said pistons are reciprocated and said propellers are driven at constantly proportionate angular velocities to one another.

2. An improved fluid borne, propeller driven aircraft, as claimed in claim 1, in which said means for moving hydraulic fluid connects said motors in series with each other between a supply passage means and a return passage means of the source of hydraulic fluid under pressure.

3. An improved fluid borne, propeller driven aircraft, as claimed in claim 2, in which said means for moving hydraulic fluid comprises flow lines connecting hydraulic motors in series with each other between fluid supply connection means and fluid return means with the source of hydraulic fluid under pressure.

4. An improved fluid borne, propeller driven aircraft, as claimed in claim 1, in which said fluid flow means for moving hydraulic fluid connects said motors in parallel with each other, whereby each flow of fluid from respective supply connection means is passed to return connection means to said source of hydraulic fluid under pressure.

5. An improved fluid borne, propeller driven aircraft, as claimed in claim 4, in which said means for moving hydraulic fluid comprises flow lines connecting hydraulic motors in parallel with each other between supply connection means and return connection means with the said source of hydraulic fluid under pressure.

6. An improved fluid borne, propeller driven aircraft, as claimed in claim 1, including a third hydraulic motor, means for mounting said third hydraulic motor laterally of said body for angular adjustment of the axis of rotation of said body relative to the coaxial drive shafts, a third propeller operably connected to and driven by said third hydraulic motor, and fluid flow lines connecting the source of hydraulic fluid under pressure to said third motor, whereby controlling the speed and direction of rotation of said third propeller results in control of the attitude of the aircraft, said attitude being further controlled by angular adjustment of said third motor.

7. A hydrostatically operated synchronization device for counter revolving coaxially arranged rotors, comprising means for driving fluid for supplying pressure to move such rotor, at least two hydrostatic motors, drive shafts for said motors arranged coaxially, at least one of said shafts having a hollow rotor and shaft through which the shaft of the other motor extends, fluid lines from said means for driving fluid to at least one of said motors and from at least one of said motors to said means for driving fluid, fluid communication means for communicating and passing fluid under pressure to and through said other motor and therefrom, separately sealed working chambers in said means for driving fluid and in said motors for passing hydraulic fluid therethrough, said working chambers including a plurality of individual working chambers, which increase and decrease their volumes periodically between definitely set minimum and maximum volume values, the communication means from and to said means for driving fluid and said motors being so arranged and connected to revolve said motors and rotors in opposite rotary angular direction but with definitely forced and maintained substantial proportionate rotary angular velocity, said means including a pump housing, a rotor for fluid handling rotatably mounted in said pump housing having a first chamber and a second chamber separated from said first chamber, first inlet means for connecting said first chamber with said fluid flow lines, second inlet means for connecting said second chamber with said fluid flow lines, first outlet means for connecting said first chamber with said fluid flow lines, second outlet means for connecting said second chamber with said fluid flow lines, at least two pistons slidably mounted in said rotor, at least one first piston slidably positioned so as to move into and out of said first chamber, and at least one second piston slidably positioned so as to move into and out of said second chamber, an eccentric actuator sleeve rotatable in said pump housing within which said rotor is rotatably mounted engaged with said pistons as said rotor turns within said pump housing.

8. A hydrostatically operated synchronization device for counter revolving coaxially arranged rotors, according to claim 7, wherein rotors are affixed to the output shafts of said hydrostatic motors.

9. A hydrostatically operated synchronization device for counter revolving coaxially arranged rotors, according to claim 8, wherein said rotors comprise abrasive working means including cutters, grinders and polishers.

10. A hydrostatically operated synchronization device for counter revolving coaxially arranged rotors, according to claim 9, wherein the diameter of at least one of said rotors is larger than the diameter of said hydraulic motors.

* * * * *